(12) United States Patent
Saraie et al.

(10) Patent No.: US 9,707,666 B2
(45) Date of Patent: Jul. 18, 2017

(54) WORKPIECE FIXING JIG AND WORKPIECE FIXING METHOD USING THE SAME

(71) Applicants: DMG MORI CO., LTD., Nara (JP); Intelligent Manufacturing Systems International, San Francisco, CA (US)

(72) Inventors: Hidenori Saraie, Nara (JP); Kinji Hashimoto, Nara (JP); Kazuo Yamazaki, El Macero, CA (US)

(73) Assignees: DMG MORI CO., LTD., Nara (JP); INTELLIGENT MANUFACTURING SYSTEMS INTERNATIONAL, San Francisco, CA (US)

( * ) Notice: Subject to any disclaimer, the term of this patent is extended or adjusted under 35 U.S.C. 154(b) by 0 days.

(21) Appl. No.: 14/944,372

(22) Filed: Nov. 18, 2015

(65) Prior Publication Data
US 2016/0167201 A1    Jun. 16, 2016

(30) Foreign Application Priority Data

Dec. 16, 2014  (JP) .................. 2014-253778

(51) Int. Cl.
*B25B 1/10*  (2006.01)
*B25B 1/24*  (2006.01)
(Continued)

(52) U.S. Cl.
CPC .................. *B25B 1/10* (2013.01); *B23Q 3/02* (2013.01); *B23Q 3/066* (2013.01); *B25B 1/103* (2013.01);
(Continued)

(58) Field of Classification Search
CPC ....... B25B 1/103; B25B 1/2405; B25B 5/165; B25B 1/24; B25B 1/163; B25B 5/163; B25B 5/08; B23Q 3/061; B23Q 1/035
(Continued)

(56) References Cited

U.S. PATENT DOCUMENTS 320,831 A * 6/1885 Scribner ............... B07B 13/113
209/694
713,189 A   11/1902 Yates
(Continued)

FOREIGN PATENT DOCUMENTS

JP     04009241 U1   1/1992

OTHER PUBLICATIONS

European Search Report for related European Application No. 15198617; report dated May 16, 2016.

*Primary Examiner* — Larry E Waggle, Jr.
*Assistant Examiner* — Mahdi H Nejad
(74) *Attorney, Agent, or Firm* — Miller, Matthias & Hull LLP

(57) ABSTRACT

A workpiece fixing jig 1 includes a base 2 to be fixed on a table, and a clamping mechanism 10 provided on the base 2 for clamping a workpiece. The clamping mechanism 10 includes a first clamping portion 20 and a second clamping portion 30 provided to face each other. At least one of the first and second clamping portions 20 and 30 is configured to move forward and backward with respect to the other along a moving direction and the moving direction is set to a direction intersecting a direction in which the base 2 is fixed on the table. In using this workpiece fixing jig 1, the base 2 is fixed on the table after the workpiece is clamped between the first clamping portion 20 and the second clamping portion 30.

10 Claims, 3 Drawing Sheets

(51) Int. Cl.
*B23Q 3/02* (2006.01)
*B23Q 3/06* (2006.01)

(52) U.S. Cl.
CPC .......... *B25B 1/2405* (2013.01); *B25B 1/2463* (2013.01); *B23Q 3/06* (2013.01); *B25B 1/2484* (2013.01); *Y10T 29/49998* (2015.01)

(58) Field of Classification Search
USPC ... 269/246, 254 CS, 224, 55, 263, 275, 285, 269/267, 264, 281, 87.2, 58, 254 R, 170, 269/160, 157, 70, 241, 248, 86, 559, 305
See application file for complete search history.

(56) References Cited

U.S. PATENT DOCUMENTS

| | | | | |
|---|---|---|---|---|
| 1,066,357 | A * | 7/1913 | Yardley | B25B 1/08 269/188 |
| 2,432,352 | A | 12/1947 | Strotz | |
| 2,718,165 | A * | 9/1955 | Bourassa | B25B 1/103 269/241 |
| 2,867,003 | A * | 1/1959 | Stiles | B29C 33/202 249/82 |
| 2,882,656 | A * | 4/1959 | Novkov | B25B 1/103 269/258 |
| 2,928,320 | A * | 3/1960 | Stokey | B25B 5/107 269/285 |
| 3,055,654 | A * | 9/1962 | Harrison | B25B 5/101 269/143 |
| 3,210,069 | A * | 10/1965 | Holtz | B25B 5/105 269/238 |
| 3,224,755 | A * | 12/1965 | Schweitzer | B23Q 17/22 116/303 |
| 3,711,929 | A * | 1/1973 | Blakey | B23Q 3/107 269/276 |
| 4,034,971 | A * | 7/1977 | Tsuyama | B23K 37/0435 269/249 |
| 4,046,364 | A | 9/1977 | Coope et al. | |
| 4,552,042 | A * | 11/1985 | Beymer | B25B 1/10 81/473 |
| 4,557,371 | A * | 12/1985 | Yonezawa | B23Q 3/061 198/803.3 |
| 4,821,393 | A * | 4/1989 | Spigarelli | B23Q 3/183 269/224 |
| 4,960,269 | A * | 10/1990 | Fong | B25B 1/2405 269/224 |
| 5,242,043 | A * | 9/1993 | Sturm | B23Q 1/015 198/345.3 |
| 5,791,640 | A * | 8/1998 | Webster | B25B 1/103 269/246 |
| 6,264,186 | B1 * | 7/2001 | Hill | B23Q 1/032 269/289 R |
| 6,439,083 | B1 * | 8/2002 | Molstad | B23Q 16/001 417/388 |
| 6,644,637 | B1 * | 11/2003 | Shen | B25B 5/061 269/152 |
| 6,651,967 | B1 * | 11/2003 | Barber | B23K 37/0533 228/49.3 |
| 2006/0157905 | A1 * | 7/2006 | Lenzini | B25B 11/005 269/21 |
| 2008/0203637 | A1 * | 8/2008 | Li | B25B 1/103 269/71 |
| 2009/0140482 | A1 * | 6/2009 | Saberton | B23Q 1/035 269/296 |
| 2015/0246431 | A1 * | 9/2015 | Shute | B25B 5/163 144/195.4 |

* cited by examiner

WORKPIECE FIXING JIG AND WORKPIECE FIXING METHOD USING THE SAME

BACKGROUND

Field of the Disclosure

The present disclosure relates to a workpiece fixing jig for fixing a workpiece on a table of a machine tool, and a workpiece fixing method for fixing a workpiece on a table of a machine tool using the workpiece fixing jig.

Background of the Disclosure

For example, a clamp unit as disclosed in Japanese Unexamined Utility Model Application Publication No. H4-9241 has hitherto been known as a workpiece fixing jig for fixing a workpiece on a table of a machine tool.

This clamp unit is composed of a positioning block having a shape formed by bonding a columnar part and a rectangular parallelepiped part, a hook clamp inserted in a guide hole bored in the columnar part along a center axis of the columnar part, a clamp bolt inserted through the hook clamp along the guide hole and screwed in a screw hole formed in the positioning block, and a tubular spacer having an arcuate cross section and detachably fitted on the columnar part. Note that, on this clamp unit, the upper surface of the spacer is a first reference surface and the circumferential surface of the columnar part is a second reference surface.

According to the clamp unit having the above-described configuration, a workpiece is fixed on a surface plate (table) with a plurality of the clamp units arranged as appropriate on the surface plate. That is, first, the positioning blocks of the plurality of clamp units are arranged as appropriate on the surface plate. Thereafter, the positioning blocks are fixed on the surface plate with a workpiece placed on the upper surfaces of the spacers (first reference surfaces) and in contact with the circumferential surfaces of the columnar parts (second reference surfaces). Subsequently, each hook clamp is turned around its axis until a portion of the hook clamp is positioned above the workpiece, after which the clamp bolts are tightened one after another. Thereby, the workpiece is pressed against the upper surfaces of the spacers by the hook clamps and clamped between the hook clamps and the spacers; consequently, the workpiece is fixed on the surface plate.

SUMMARY OF THE DISCLOSURE

However, since the above-described conventional clamp unit is configured to clamp a workpiece between the hook clamp and the spacer by pressing the workpiece against the placement surface (upper surface) of the spacer with the hook clamp, there is a problem that clamping distortion occurs if the placed surfaces of the workpiece, which surfaces are placed on the upper surfaces of the spacers, are not positioned with high accuracy in the same plane.

That is, for example, in the case where a workpiece is clamped with four clamp units as shown in FIGS. 3 to 5 and 8 of the above-mentioned Japanese Unexamined Utility Model Application Publication No. H4-9241, if the lower surface of the workpiece is not finished with a high degree of flatness, this causes the following: when the workpiece is placed on the upper surfaces of the spacers, the upper surfaces of three of the four spacers are brought into contact with the workpiece bottom surface, whereas there is a gap between the upper surface of the remaining one spacer and the workpiece bottom surface. Accordingly, when the clamp bolt of the clamp unit corresponding to the remaining one spacer is tightened to press the workpiece against the upper surface of the spacer with the hook clamp, the workpiece is elastically deformed and distortion occurs on the workpiece.

Accordingly, if a workpiece subject to clamping distortion as described above is machined, when the clamping is released after the machining, the machining accuracy, which has reached a predetermined level before the release of the clamping, deteriorates correspondingly to the amount of the distortion because the workpiece is restored to its original shape.

Further, in the case where a workpiece is fixed with a plurality of the clamp units, it is necessary to set the clamping force of each of the clamp units to a predetermined appropriate level in order to stabilize the state of machining. For example, in the case of heavy cutting, a clamping force capable of stably fixing the workpiece against the cutting resistance is required.

However, since the above-described conventional clamp unit clamps a workpiece by means of a tightening force of the clamp bolt, it is necessary to tighten the clamp bolts using a special tool such as a torque wrench at the final tightening step in order to make the clamping force of each of the clamp units constant, and this operation is considerably complex.

The present disclosure has been achieved in view of the above-described circumstances, and an object thereof is to provide a workpiece fixing jig which hardly causes clamping distortion and a workpiece fixing method using the workpiece fixing jig. Another object thereof is to provide a workpiece fixing jig which is capable of clamping a workpiece by means of a preset constant force.

The present disclosure solves the above-described problems by providing a workpiece fixing jig for fixing a workpiece on a table of a machine tool, including:

a base to be fixed onto the table; and a clamping mechanism provided on the base for clamping the workpiece, wherein the clamping mechanism includes a first clamping portion and a second clamping portion provided to face each other, at least one of the first and second clamping portions is configured to move forward and backward with respect to the other along a moving direction, and the moving direction intersects a direction in which the base is fixed to the table.

Further, in the workpiece fixing method according to the present disclosure using the workpiece fixing jig, a workpiece is fixed on a table of a machine tool in the following manner. Note that the workpiece is being supported on the table by appropriate support tools.

First, on the table, the workpiece fixing jigs are arranged at positions at which the first and second clamping portions can clamp clamped portions defined on the workpiece. Subsequently, the at least one of the first and second clamping portions of each of the workpiece fixing jigs is moved forward along the moving direction so that the clamped portion of the workpiece is clamped by the first and second clamping portions, and then the base of each of the workpiece fixing jigs is fixed onto the table. In this way, the workpiece is fixed on the table.

As described above, the moving direction between the first clamping portion and the second clamping portion of the workpiece fixing jig of the present disclosure intersects the direction in which the base is fixed to the table, i.e., a vertical direction. Therefore, when the first and second clamping portions clamp the clamped portion of the workpiece, this does not cause the workpiece fixing jig to lift up, and therefore the workpiece fixing jig is kept in a placed state in which the bottom surface of the base thereof is in contact with the top surface of the table. Therefore, when the workpiece fixing jig is subsequently fixed onto the table, this does not cause displacement in the first and second clamping portions and no clamping distortion occurs on the workpiece in the moving direction between the first clamping portion and the second clamping portion and in the vertical direction.

Note that, in using the workpiece fixing jig of the present disclosure, from a viewpoint of maximally preventing clamping distortion, it is preferable that, as described above, the base is fixed onto the table after the clamped portion of the workpiece has been clamped by the first and second clamping portions. However, another mode is possible in which the base is fixed onto the table after the other one of the first and second clamping portions has been brought into contact with the clamped portion of the workpiece, and then the clamped portion of the workpiece is clamped by the first and second clamping portions; this mode is also capable of favorably preventing clamping distortion. Alternatively, in the case where both of the first and second clamping portions are configured to be able to move forward and backward, a mode is possible in which, after the base has been fixed on the table, both of the first and second clamping portions are moved forward as appropriate so that the clamped portion of the workpiece is clamped by the first and second clamping portions without causing distortion.

Further, it is preferred that the moving direction of the first and second clamping portions is set to be a direction orthogonal to the direction in which the base is fixed to the table. In this case, the moving direction is a horizontal direction since the direction in which the base is fixed to the table is a vertical direction.

Further, the workpiece fixing jig of the present disclosure may include a support provided thereon between the first clamping portion and the second clamping portion for receiving the workpiece. The support should preferably be provided so that its position in the height direction is adjustable. Providing the support to receive the workpiece makes it possible to clamp the workpiece in a more stable state with the first and second clamping portions.

Further, the workpiece fixing jig according to the present disclosure may have a configuration in which:

the first clamping portion is composed of a screw shaft, the clamping mechanism includes: a first block having a through hole formed therein and holding the first clamping portion in the through hole, the through hole being formed along the moving direction and having a large diameter on a side closer to the second clamping portion and a small diameter on a side opposite thereto; a second block holding the second clamping portion; a biasing body inserted in a deep side of the large diameter side of the through hole of the first block; and a nut inserted in an open side of the large diameter side of the through hole in a non-rotatable manner, and the first clamping portion is screwed in the nut in a state of passing through the biasing body and has a distal end protruding toward the second clamping portion.

In using this workpiece fixing jig, first, the clamped portion of the workpiece is arranged between the first clamping portion and the second clamping portion, and then the first clamping portion is turned around its axis in a forward direction that allows the first clamping portion to move forward toward the second clamping portion due to the screwing relationship between the first clamping portion and the nut, whereby the clamped portion of the workpiece is clamped by the first clamping portion and the second clamping portion. Subsequently, when the first clamping portion is further turned in the forward direction after the clamped portion of the workpiece has been clamped, the nut moves backward due to the screwing relationship between the first clamping portion and the nut, and thereby a biasing force of the biasing body acts on the first clamping portion via the nut and the clamped portion of the workpiece is clamped by the first clamping portion and the second clamping portion by means of the biasing force. Thus, this workpiece fixing jig clamps the clamped portion of the workpiece not by means of the thrust of the screw shaft but by means of the biasing force of the biasing body.

Note that a resilient body which contracts due to an external force and produces a resilient force in accordance with the amount of the contraction can be used as the biasing body. More specifically, a spring body, e.g., a disc spring or a compressed coil spring, can be used as the biasing body.

Further, it is preferred that the nut has a flange at an end thereof closer to the second clamping portion, which flange has a diameter larger than that of the large diameter side of the through hole, and the nut is inserted in the large diameter side of the through hole so that there is a predetermined gap between the flange and the first block. In this configuration, the gap between the flange and the first block determines the amount of the backward movement of the nut when the first clamping portion is further turned in the forward direction after the clamped portion of the workpiece has been clamped by the first and second clamping portions, and the clamped portion of the workpiece is clamped by means of a biasing force of the biasing body which is determined by the gap. Accordingly, setting the gap as appropriate allows the clamped portion of the workpiece to be clamped by means of a constant force determined in accordance with the gap.

Further, it is preferred that the second clamping portion is composed of an attachment portion fixed to the second block and a contact portion connected to the attachment portion so that the connecting angle is changeable. This configuration allows the second clamping portion to clamp the clamped portion of the workpiece in a stable state.

As described above, the workpiece fixing jig of the present disclosure makes it possible to fix a workpiece on a table without causing clamping distortion because the moving direction between the first clamping portion and the second clamping portion is set to a direction intersecting the direction in which the base is fixed to the table. Further, the workpiece fixing method of the present disclosure makes it possible to fix a workpiece on a table with less clamping distortion because the workpiece fixing jig having the above-described configuration is fixed on the table after a clamped portion of the workpiece has been clamped by the first and second clamping portions of the workpiece fixing jig.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Figure 1:
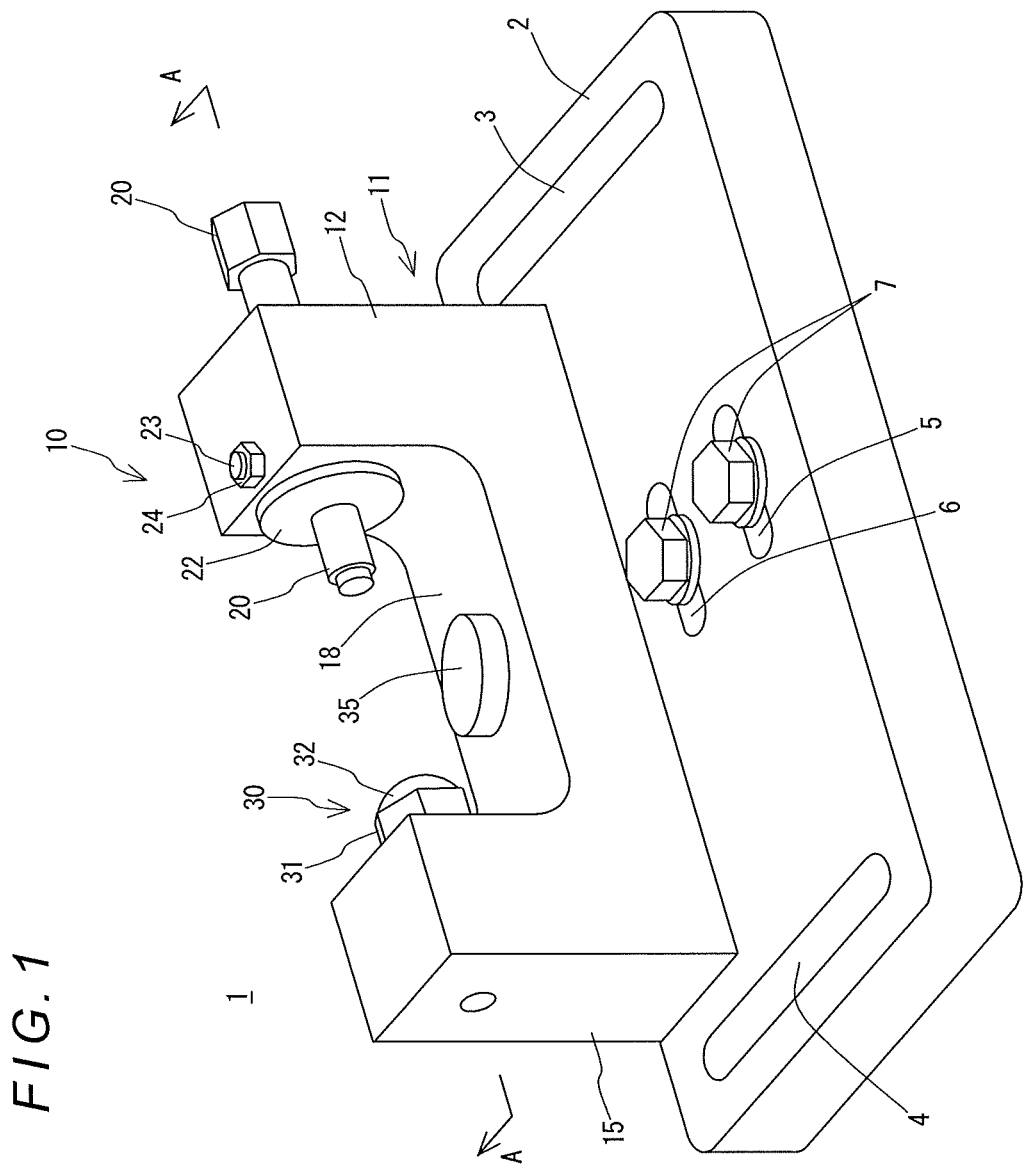
FIG. 1 is a perspective view showing a workpiece fixing jig according to one embodiment of the present disclosure.
Figure 2:
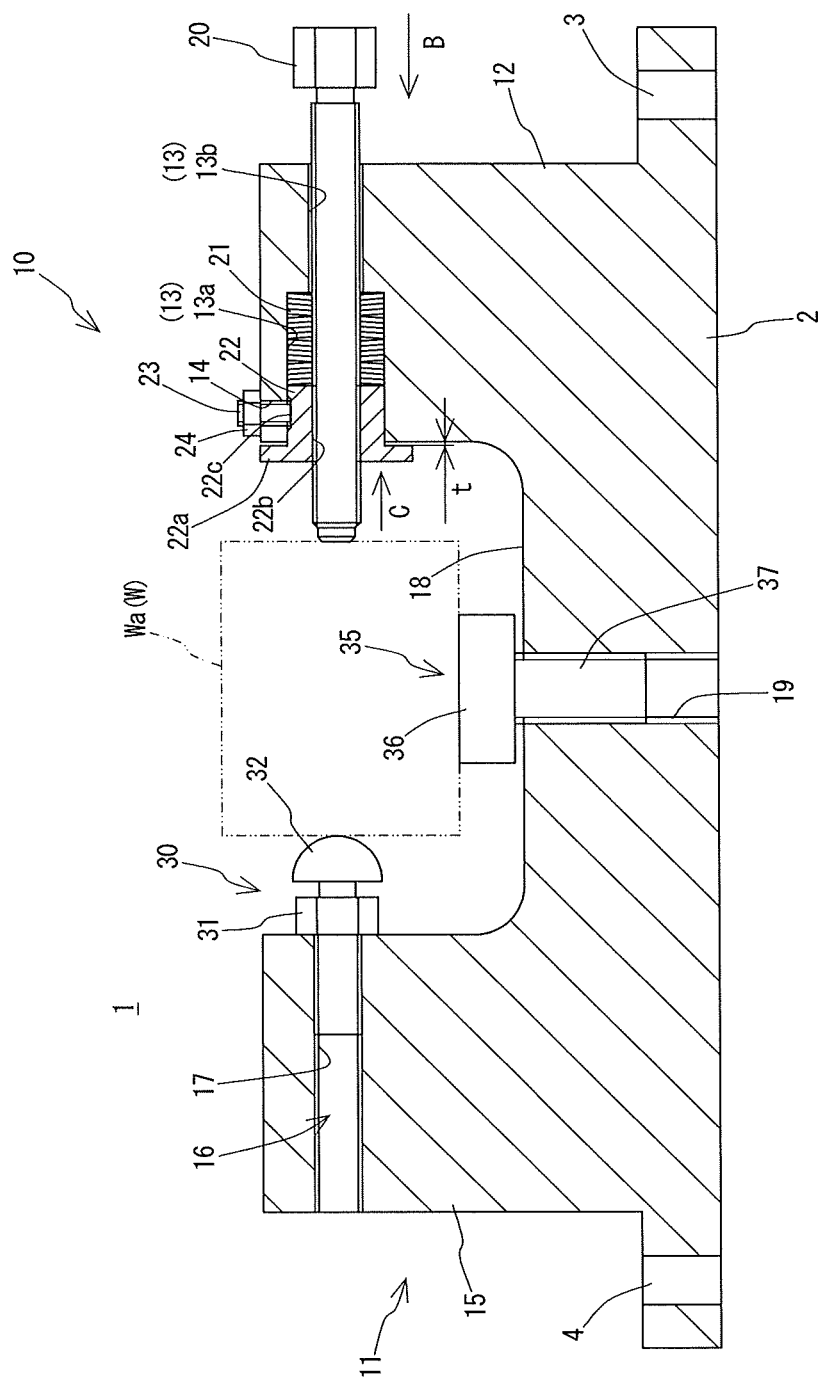
FIG. 2 is a sectional view taken as indicated by the arrows A-A in FIG. 1.

Hereinafter, a specific embodiment of the present disclosure will be described with reference to the drawings. FIG. 1 is a perspective view showing a workpiece fixing jig according to the embodiment, and FIG. 2 is a sectional view taken as indicated by the arrows A-A in FIG. 1.

As shown in FIG. 1, a workpiece fixing jig 1 of this embodiment includes a rectangular parallelepiped (or plate-shaped) base 2 and a clamping mechanism 10 provided on the base 2. The clamping mechanism 10 includes a block body 11 having a U-shape in front view, and a first clamping portion 20 and a second clamping portion 30 coaxially held by the block body 11 in such a manner that they face each other.

The base 2 has slots 3 and 4 formed therein at the edges of the shorter sides thereof, which slots are formed along the shorter sides of the base 2 and penetrate the base 2 vertically. Further, the base 2 has two slots 5 and 6 formed therein in front of the block body 11 in the figure, which slots are formed in parallel along the longitudinal direction of the block body 11 and which also penetrate the base 2 vertically. Note that fixing bolts 7 for fixing the workpiece fixing jig 1 on an appropriate table are to be inserted through the slots 3, 4, 5, and 6. Further, the base 2 and the block body 11 may be fixedly attached to each other or may be formed integrally.

A first block 12, which is one of the upright portions of the block body 11, has a through hole 13 bored therein; the through hole 13 penetrates the first block 12 horizontally from its outer side surface to its inner side surface that is located within the U-shape. A second block 15, which is the other one of the upright portions and is located opposite the first block 12, also has a through hole 16 bored therein; the through hole 16 is coaxial with the through hole 13 and penetrates the second block 15 from its outer side surface to its inner side surface that is located within the U-shape. The through hole 13 has a large-diameter portion 13a on the side closer to the second block 15 and a small-diameter portion 13b on the opposite side. A disc spring 21 that is a biasing body is inserted in the deep side of the large-diameter portion 13a and a nut 22 is inserted in the open side of the large-diameter portion 13a. Further, the through hole 16 forms a screw hole 17.

The nut 22 has a flange 22a at the end thereof closer to the second block 15; the flange 22a has a diameter larger than that of the large-diameter portion 13a of the through hole 13. The nut 22 is inserted in the large-diameter portion 13a so that there is a predetermined gap t between the flange 22a and the inner side surface of the first block 12 when the nut 22 is in contact with the disc spring 21. Further, the nut 22 has a flat surface 22c formed in an upper periphery thereof with a predetermined depth, while the first block 12 has a restraining bolt 23 that is screwed in a screw hole 14 formed to penetrate the first block 12 from its upper surface to the large-diameter portion 13a. Engagement between the lower end of the restraining bolt 23 and the flat surface 22c restrains the nut 22 from rotating around its axis.

Further, the nut 22 can move in its axial direction a distance equal to a difference between the width of the flat surface 22c in the axial direction and the diameter of the restraining bolt 23; the nut 22 can move at least a distance larger than the gap t. Note that reference numeral 24 denotes a lock nut screwed on the restraining bolt 23.

The first clamping portion 20 is composed of a bolt having a hexagonal head; the first clamping portion 20 is inserted in the through hole 13 from the outer side surface of the first block 12 and is screwed in a screw portion 22b of the nut 22 in a state of passing through the disc spring 21, and an end thereof protrudes toward the second block 15. The first clamping portion 20 moves forward in a horizontal direction indicated by the arrow B toward the second clamping portion 30 when it is turned in the screw-in direction, while the first clamping portion 20 moves backward in a horizontal direction indicated by the arrow C away from the second clamping portion 30 when it is turned in the screw-out direction.

On the other hand, the second clamping portion 30 is composed of an attachment bolt portion 31 screwed in the screw hole 17 of the second block 15, and a semi-spherical contact portion 32 connected to the attachment bolt portion 31 so that the connecting angle is changeable.

Thus, on the workpiece fixing jig 1 of this embodiment, the first clamping portion 20 moves forward or backward along a horizontal direction orthogonal to the direction in which the workpiece fixing jig 1 is fixed onto an appropriate table by the fixing bolts 7, i.e., along the direction indicated by the arrows B and C, when being turned around its axis.

Note that not only the block body 11, the first clamping portion 20, and the second clamping portion 30 but also the disc spring 21, the nut 22, the restraining bolt 23, and the lock nut 24 are components of the clamping mechanism 10.

Further, on a bottom surface 18 of the U-shape of the block body 11, a support body 35 is disposed between the first clamping portion 20 and the second clamping portion 30 below the axes of the first clamping portion 20 and the second clamping portion 30. The support body 35 is composed of a columnar receiving portion 36 and a male screw portion 37 connected to the lower surface of the receiving portion 36 and the male screw portion 37 is screwed in a screw hole 19 formed to penetrate the block body 11 the base 2 from the bottom surface 18 to the lower surface of the base 2; the support body 35 moves upward or downward when being turned around its axis.

According to the workpiece fixing jig 1 of this embodiment having the above-described configuration, a workpiece W is clamped on a table of an appropriate machine tool with clamped portions Wa thereof clamped as described below.

Figure 3:
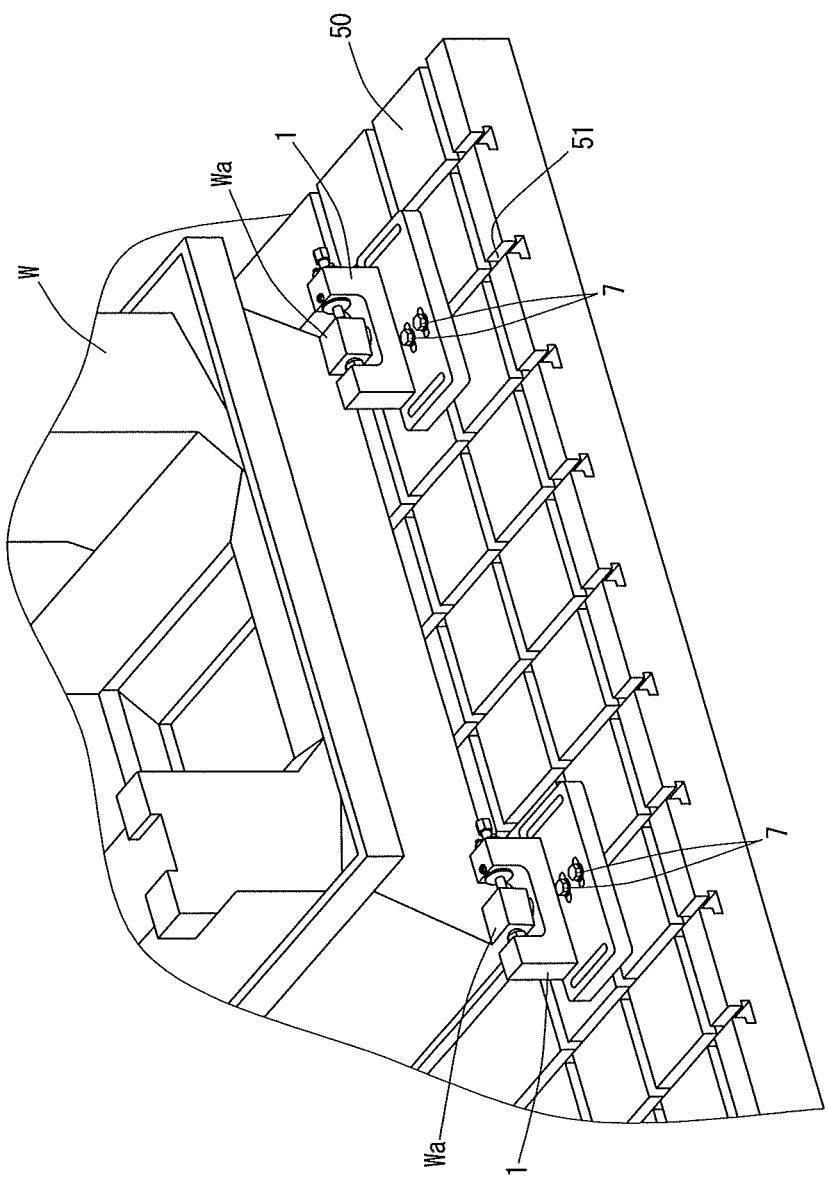
FIG. 3 is an illustration for explaining a method of fixing a workpiece on a table using the workpiece fixing jig according to the embodiment.

First, the workpiece W is placed on a table 50 of an appropriate machine tool as shown in FIG. 3. Note that the workpiece W is being supported on the table 50 by appropriate support tools. Further, the table 50 has T-slots 51 formed therein in a grid pattern and the workpiece W has rectangular parallelepiped clamped portions Wa formed on its side surfaces. The clamped portions Wa are provided at several points around the workpiece W as appropriate and each of the clamped portions Wa is clamped by the workpiece fixing jig 1 of this embodiment. Since the workpiece fixing jigs 1 perform the same clamping operation, a mode in which the clamped portions Wa shown in FIG. 3 are clamped is exemplarily described below.

Subsequently, the fixing bolts 7 are inserted through the slots 5 and 6 of each of the workpiece fixing jigs 1, and T-nuts (not shown) are screwed with the fixing bolts 7 and the T-nuts (not shown) in this state are inserted in the T-slots 51 of the table 50, whereby each of the workpiece fixing jigs 1 is arranged on the table 50 so that the clamped portion Wa is positioned between the first clamping portion 20 and the second clamping portion 30 and the contact portion 32 of the second clamping portion 30 is brought into contact with a side surface of the clamped portion Wa.

Note that, in this state, the first clamping portion 20 is at a position backward in the arrow C direction; therefore, the clamped portion Wa can enter between the distal end of the first clamping portion 20 and the contact portion 32. Further, the support body 35 is in a state of having been screwed downward; therefore, the upper surface of the receiving portion 36 is not in contact with the lower surface of the clamped portion Wa.

Subsequently, the support body 35 is turned in the upward-movement direction to bring the upper surface of the receiving portion 36 into contact with the lower surface of the clamped portion Wa, and then the first clamping portion 20 is turned in the screw-in direction to move the first clamping portion 20 in the arrow B direction, whereby the clamped portion Wa is clamped at its side surfaces by the distal end of the first clamping portion 20 and the contact portion 32 of the second clamping portion 30.

At this time, when the first clamping portion 20 is further turned in the screw-in direction after its distal end has been brought into contact with the side surface of the clamped portion Wa, since the first clamping portion 20 cannot move in the arrow B direction and the nut 22 is held in a non-rotatable manner, the screwing relationship between the first clamping portion 20 and the nut 22 causes the nut 22 to move backward in the arrow C direction until the flange 22a thereof is brought into contact with the first block 12. This backward movement of the nut 22 compresses the disc spring 21 and a resilient force of the disc spring 21 acts on the first clamping portion 20 via the nut 22; consequently, the clamped portion Wa is clamped by the first clamping portion 20 and the second clamping portion 30 by means of the resilient force of the disc spring 21.

Next, after the clamped portion Wa has been clamped by the first clamping portion 20 and the second clamping portion 30 as described above, the fixing bolts 7 are tightened to fix the workpiece fixing jig 1 on the table 50. In this way, the workpiece W is fixed, that is, clamped, on the table 50 by the workpiece fixing jigs 1.

Thus, according to the workpiece fixing jig 1 of this embodiment, the moving direction of the first clamping portion 20 is set to a horizontal direction which is orthogonal to and intersects the direction in which the base 2 is fixed to the table 50 (a vertical direction). Therefore, when the clamped portion Wa of the workpiece W is clamped by the first clamping portion 20 and the second clamping portion 30, this does not cause the workpiece fixing jig 1 to lift up and the workpiece fixing jig 1 is kept in a placed state in which the bottom surface of the base 2 is in contact with the top surface of the table 50.

Therefore, when the workpiece fixing jig 1 is subsequently fixed onto the table 50, this does not cause displacements in the positions of the first clamping portion 20 and the second clamping portion 30, and no clamping distortion occurs on the workpiece W in the moving direction of the first and second clamping portions and in the vertical direction. That is, the workpiece fixing jig 1 of this embodiment is capable of fixing the workpiece W on the table 50 without causing clamping distortion.

In this connection, measurements were made to determine displacements in the upper surface of the clamped portion Wa and in the side surfaces of the clamped portion Wa clamped by the first clamping portion 20 and the second clamping portion 30 before and after the workpiece W was fixed onto the table 50 in the above-described mode with the workpiece fixing jig 1 of this embodiment. The displacement in the upper surface was 8 µm in the first measurement, 7 µm in the second measurement, 4 µm in the third measurement, 5 µm in the fourth measurement, and 3 µm in the fifth measurement; the average value was 5.4 µm. On the other hand, the displacement in the side surfaces was 2 µm in the first measurement, 8 µm in the second measurement, 7 µm in the third measurement, 5 µm in the fourth measurement, and 1 µm in the fifth measurement; the average value was 4.6 µm. Favorable results were obtained for both the upper surface and the side surfaces.

Further, in using the workpiece fixing jig 1 of this embodiment, the clamped portion Wa is clamped by the first clamping portion 20 and the second clamping portion 30 by means of the resilient force of the disc spring 21 and the resilient force of the disc spring 21 is determined by the gap t between the flange 22a and the first block 12; therefore, the clamped portion Wa can be clamped by means of a constant force determined in accordance with the gap t.

Further, since the workpiece fixing jig 1 of this embodiment has the support body 35 provided at a lower position between the first clamping portion 20 and the second clamping portion 30 for receiving the workpiece W, the first clamping portion 20 and the second clamping portion 30 can clamp the workpiece W in a more stable state, and further it is also possible to stabilize the clamped state of the workpiece W when the workpiece W is machined afterwards.

Further, since the contact portion 32 of the second clamping portion 30 that is brought into contact with the clamped portion Wa is connected to the attachment bolt portion 31 so that the connecting angle is changeable, even if the side surface of the clamped portion Wa has a poor flatness, the contact portion 32 can change its orientation so as to achieve an angle appropriate for the side surface when being brought into contact with the side surface of the clamped portion Wa for the clamping. Therefore, the first clamping portion 20 and the second clamping portion 30 can clamp the clamped portion Wa in a stable state.

A specific embodiment of the present disclosure has been described above; however, the present disclosure is not limited thereto and can be implemented in other modes.

For example, although the disc spring 21 is used as the means for applying a resilient force to the first clamping portion 20 via the nut 22 in the above embodiment, the means is not limited thereto and any resilient body can be used as long as it contracts due to an external force and produces a resilient force in accordance with the amount of the contraction. For example, a spring body such as a compressed coil spring can be used instead of the disc spring 21.

Further, as for the method of fixing the workpiece W on the table 50 using the workpiece fixing jig 1, although a mode in which the base 2 of the workpiece fixing jig 1 is fixed onto the table 50 after the clamped portion Wa of the workpiece W is clamped by the first clamping portion 20 and the second clamping portion 30 is described as an example in the above embodiment, the present disclosure is not limited thereto. Another mode is possible in which the workpiece fixing jig 1 is fixed onto the table 50 by the fixing bolts 7 after the workpiece fixing jig 1 has been arranged on the table 50 so that the contact portion 32 of the second clamping portion 30 is brought into contact with the side surface of the clamped portion Wa, and then the clamped portion Wa of the workpiece W is clamped by the first clamping portion 20 and the second clamping portion 30.

From a viewpoint of maximally preventing clamping distortion, it is preferable that, as in the above embodiment, the workpiece fixing jig 1 is fixed onto the table 50 after the workpiece W has been clamped by the first clamping portion 20 and the second clamping portion 30. However, since the workpiece fixing jig 1 of the above embodiment has the configuration in which the moving direction of the first clamping portion 20 is orthogonal to the direction of fixation to the table 50, when the clamped portion Wa of the workpiece W is clamped by the first clamping portion 20 and the second clamping portion 30, this does not cause the workpiece fixing jig 1 to lift up. Therefore, clamping distortion can be favorably prevented even in the mode in which the workpiece W is clamped by the first clamping portion 20 and the second clamping portion 30 after the workpiece fixing jig 1 has been fixed onto the table 50.

In this connection, measurements were made to determine displacements in the upper surface of the clamped portion Wa and in the side surfaces of the clamped portion Wa clamped by the first clamping portion 20 and the second clamping portion 30 before and after the workpiece W was fixed onto the table 50 in this mode with the workpiece fixing jig 1. The displacement in the upper surface was 5 µm in the first measurement, 5 µm in the second measurement, 10 µm in the third measurement, 10 µm in the fourth measurement, and 5 µm in the fifth measurement; the average value was 7.0 µm. On the other hand, the displacement in the side surfaces was 20 µm in the first measurement, 22.0 µm in the second measurement, 25 µm in the third measurement, 20 µm in the fourth measurement, and 23 µm in the fifth measurement; the average value was 22.0 µm. Although the displacement in the side surfaces was relatively larger than that in the mode in the above-described embodiment, the displacement in the upper surface was almost equivalent.

Further, although, in the above embodiment, the first clamping portion 20 is configured to be able to move forward and backward along its axial direction, a configuration is possible in which the second clamping portion 30 is configured to be able to move forward and backward along its axial direction, and a configuration is also possible in which both of the first clamping portion 20 and the second clamping portion 30 are configured to be able to move forward and backward along their respective axial directions.

Further, although the moving direction of the first clamping portion 20 is a horizontal direction in the above embodiment, it is not limited to a horizontal direction and all the moving direction of the first clamping portion 20 is required to do is to intersect the direction in which the base 2 is fixed to the table 50.

Further, although the first block 12 and the second block 15 are integrally formed as the block body 11 in the above embodiment, the present disclosure is not limited thereto and the first block 12 and the second block 15 may be separately provided. In this case, the support body 35 may be disposed on the base 2 between the first block 12 and the second block 15; the support body 35 in this case is screwed in a screw hole formed in the base 2.

What is claimed is:

1. A method of fixing a workpiece on a table of a machine tool using a workpiece fixing jig,
the workpiece fixing jig comprising:
a base to be fixed on the table;
a clamping mechanism provided on the base for clamping the workpiece,
the clamping mechanism including a first clamping portion and a second clamping portion provided to face each other;
at least one of the first and second clamping portions being configured to move forward and backward with respect to the other along a moving direction; and
the moving direction intersecting a direction of fixation of the base to the table, and
the workpiece having a plurality of rectangular parallelepiped clamped portions formed on a side surface thereof,
the method comprising:
placing the workpiece on the table;
thereafter, clamping the clamped portions of the workpiece using a plurality of said workpiece fixing jigs, each of the clamped portions being clamped between the first clamping portion and the second clamping portion of each of the workpiece fixing jigs; and
thereafter, fixing the base of each of the workpiece fixing jigs onto the table.

2. The method according to claim 1, wherein the workpiece fixing jig has a support provided between the first clamping portion and the second clamping portion for receiving the workpiece.

3. The method according to claim 2, wherein:
the first clamping portion is composed of a screw shaft; and
the clamping mechanism includes:
a first block having a through hole formed therein and holding the first clamping portion in the through hole, the through hole being formed along the moving direction and having a large diameter on a side closer to the second clamping portion and a small diameter on a side opposite thereto;
a second block holding the second clamping portion;
a biasing body inserted in a deep side of the large diameter of the through hole of the first block; and
a nut inserted in an open side of the large diameter of the through hole in a non-rotatable manner;
wherein the first clamping portion is screwed in the nut in a state of passing through the biasing body and has a distal end protruding toward the second clamping portion.

4. The method according to claim 3, wherein the second clamping portion is composed of an attachment portion fixed to the second block, and a contact portion connected to the attachment portion so that a connecting angle between the contact portion and the attachment portion is changeable.

5. The method according to claim 3, wherein:
the nut has a flange at an end thereof closer to the second clamping portion, the flange having a diameter larger than that of the large diameter of the through hole; and
the nut is inserted in the large diameter of the through hole so that there is a predetermined gap between the flange and the first block.

6. The method according to claim 5, wherein the second clamping portion is composed of an attachment portion fixed to the second block, and a contact portion connected to the attachment portion so that a connecting angle between the contact portion and the attachment portion is changeable.

7. The method according to claim 1, wherein:
the first clamping portion is composed of a screw shaft; and
the clamping mechanism includes:
a first block having a through hole formed therein and holding the first clamping portion in the through hole, the through hole being formed along the moving direction and having a large diameter on a side closer to the second clamping portion and a small diameter on a side opposite thereto;
a second block holding the second clamping portion;
a biasing body inserted in a deep side of the large diameter of the through hole of the first block; and
a nut inserted in an open side of the large diameter of the through hole in a non-rotatable manner;

wherein the first clamping portion is screwed in the nut in a state of passing through the biasing body and has a distal end protruding toward the second clamping portion.

8. The method according to claim 7, wherein the second clamping portion is composed of an attachment portion fixed to the second block, and a contact portion connected to the attachment portion so that a connecting angle between the contact portion and the attachment portion is changeable.

9. The method according to claim 7, wherein:
the nut has a flange at an end thereof closer to the second clamping portion, the flange having a diameter larger than that of the large diameter of the through hole; and
the nut is inserted in the large diameter of the through hole so that there is a predetermined gap between the flange and the first block.

10. The method according to claim 9, wherein the second clamping portion is composed of an attachment portion fixed to the second block, and a contact portion connected to the attachment portion so that a connecting angle between the contact portion and the attachment portion is changeable.

* * * * *